(12) United States Patent
Chen

(10) Patent No.: US 7,907,685 B2
(45) Date of Patent: Mar. 15, 2011

(54) GMSK-RECEIVER WITH INTERFERENCE CANCELLATION

(75) Inventor: Weizhong Chen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 835 days.

(21) Appl. No.: 11/895,078

(22) Filed: Aug. 23, 2007

(65) Prior Publication Data

US 2009/0052591 A1  Feb. 26, 2009

(51) Int. Cl.
*H03D 3/00* (2006.01)
*H04L 27/14* (2006.01)
*H04L 1/02* (2006.01)
*H04L 27/06* (2006.01)
*H04B 1/10* (2006.01)

(52) U.S. Cl. ......... 375/336; 375/341; 375/347; 375/350
(58) Field of Classification Search .......... 375/274, 375/336, 350, 346, 347, 349, 267, 324, 340, 375/341; 455/272, 277.1, 277.2, 278.1
See application file for complete search history.

(56) References Cited

U.S. PATENT DOCUMENTS

| | | | |
|---|---|---|---|
| 5,363,412 A * | 11/1994 | Love et al. | 375/341 |
| 6,084,926 A * | 7/2000 | Zak et al. | 375/341 |
| 6,529,559 B2 | 3/2003 | Reshef | |
| 6,763,074 B1 | 7/2004 | Yang | |
| 7,450,924 B1 * | 11/2008 | Mostafa et al. | 375/350 |
| 7,565,111 B2 * | 7/2009 | Onggosanusi et al. | 375/346 |
| 2007/0058709 A1 | 3/2007 | Chen et al. | |
| 2007/0153942 A1 | 7/2007 | Zeng et al. | |
| 2007/0217554 A1 * | 9/2007 | Wetzker | 375/350 |

OTHER PUBLICATIONS

International Search report for corresponding PCT Application No. PCT/US08/69054 mailed Nov. 13, 2008.
Richard Kobylinski, Ayman Mostafa and Arunabha Ghosh, "Multiple Antenna Interference Cancellation (MAIC) Advanced Receiver for GSM Networks", 2004.

* cited by examiner

*Primary Examiner* — Betsy L Deppe
(74) *Attorney, Agent, or Firm* — Charles W. Bethards

(57) ABSTRACT

A GMSK receiver with interference cancellation includes a linear equalizer configured to be coupled to a received signal from a first antenna and to provide first soft bits, an adaptive estimator, e.g., adaptive MLSE coupled to the first soft bits and configured to provide second soft bits; a quality assessor coupled to the first soft bits and configured to provide a quality indication; and a switching function coupled to the linear equalizer and the adaptive MLSE and controlled in accordance with the quality indication to provide output soft bits corresponding to at least one of the first soft bits and the second soft bits. The GMSK receiver can be extended to multiple antennas and corresponding methods for interference cancellation in a GMSK signal are discussed.

21 Claims, 7 Drawing Sheets

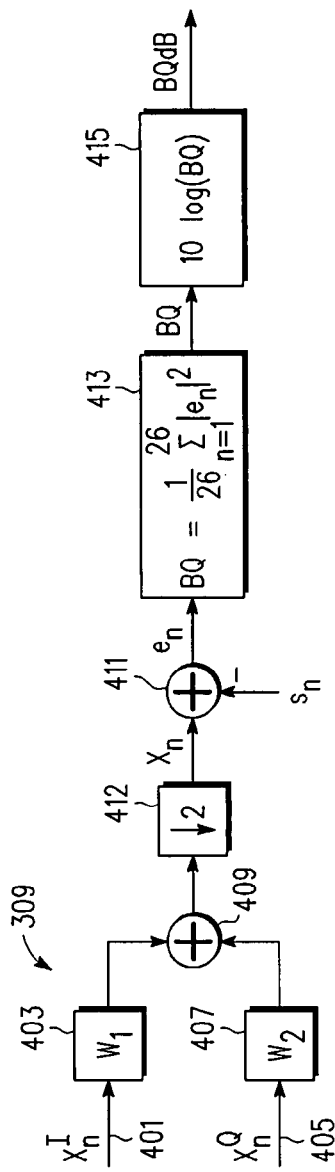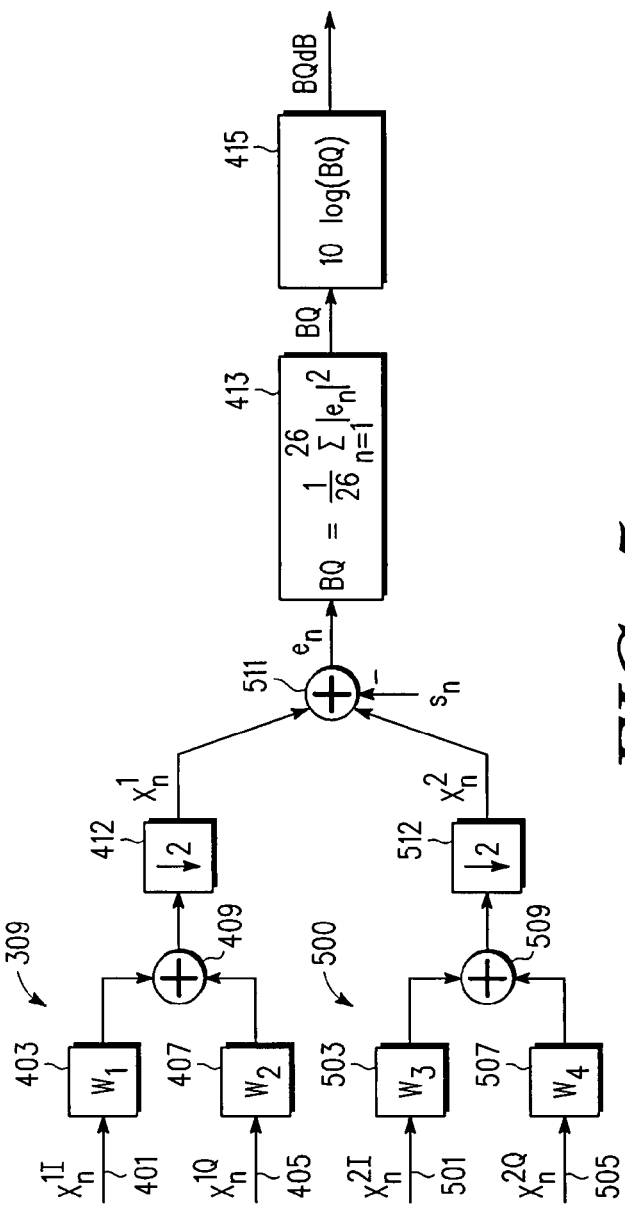

US 7,907,685 B2

GMSK-RECEIVER WITH INTERFERENCE CANCELLATION

FIELD OF THE INVENTION

This invention relates in general to receivers and more specifically a receiver for a Gaussian Minimum Shift Keyed (GMSK) signal with interference cancellation and corresponding methods.

BACKGROUND OF THE INVENTION

Receivers for radio frequency signals are known and receivers for GMSK signals are known. Such receivers are used for some equipment that is employed in Global System for Mobile communications (GSM) systems. Generally these receivers require some form of interference cancellation. One technique for interference cancellation that has been used is referred to as a linear equalizer, wherein the effects of the channel are modeled by filters that independently process a real or in phase part and an imaginary or quadrature part of the received signal. Normally a training sequence included with a GSM transmission is used by the receiver to define the two filters.

The linear equalizer is known to operate well for high levels of certain types of interference, e.g., strong or dominant co-channel interferers. The linear equalizer performs poorly for moderate levels of interference and for combinations of interference, where such combinations may include adjacent channel interferers, co-channel interferers, and noise, e.g., additive white Gaussian noise (AWGN). Other techniques either do not perform as well as the linear equalizer for strong co-channel interferers or are impossible to implement given the length of the training sequence.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 and FIG. 5 depict a block diagram of a quality assessor for, respectively, a single and dual antenna system in accordance with one or more embodiments;

DETAILED DESCRIPTION

In overview, the present disclosure concerns communication equipment and GMSK receivers with interference cancellation used therein, e.g., interference cancellation with one or more novel techniques that are responsive to a quality assessment to provide improved performance and more efficient implementation (reduction in resources needed for such cancellation). More particularly various inventive concepts and principles embodied in receivers and corresponding methods for Single Antenna Interference Cancellation (SAIC) equalizers and for Multiple Antenna Interference Cancellation (MAIC) equalizers will be discussed and disclosed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including digital signal processors, possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
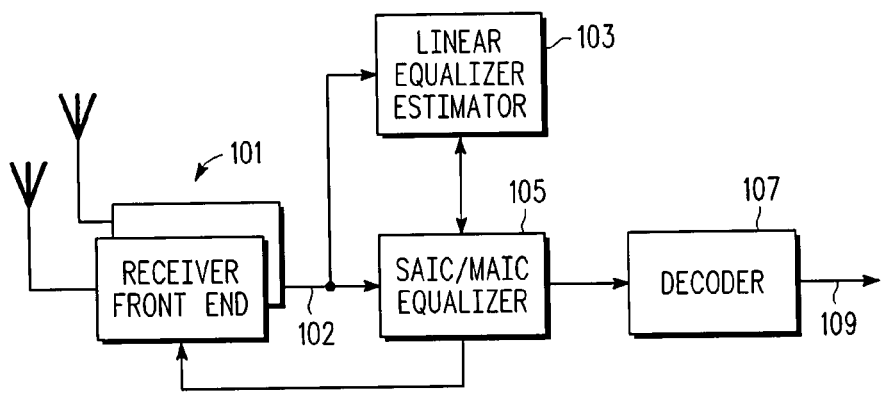
FIG. 1 depicts in a simplified and representative form, a high level diagram of a receiver including interference cancellation in accordance with one or more embodiments.

Referring to FIG. 1, a simplified and representative high level diagram of a receiver including an interference canceling equalizer in accordance with one or more embodiments will be briefly discussed and described. FIG. 1, shows a receiver front end 101 that receives a transmitted signal, e.g., from an antenna, and then amplifies, filters, and converts or translates that signal to a lower frequency and normally also converts the resultant analog signal to a digital signal, $x_n$ at 102. Note that this front end may be duplicated for receivers using two antennas as suggested by the plurality of front end blocks and antennas. A baseband signal will be provided from each front end when multiple antennas are used. The baseband signal for a GMSK receiver will include a plurality of complex samples, typically 2 samples, for each symbol period. The baseband signal, $x_n$, from the receiver front end is coupled to a linear equalizer estimator 103 or estimation function as well as a SAIC/MAIC equalizer 105. The output from the interference canceling equalizer 105 is provided as soft information (soft bits or symbols, i.e. a symbol together with confidence information) to a decoder 107 that handles error correction, etc, and provides received bits or data that are coupled to further functions, e.g., media access control (MAC), etc.

The baseband signal, $x_n$, received by the receiver can be represented as follows $$x_n = \sum_{i=0}^{L-1} h_i I_{n-i} + \eta_n \quad (1)$$

where $h_n$ is the Composite Channel Pulse Response (CPR) of L symbol periods, including the effects of the transmitted symbol pulse, multi-path fading, and receiver filters; $I_n$ is the information sequence, and $\eta_n$ represents the combination of Additive White Gaussian Noise (AWGN), co-channel interferences and adjacent channel interferences. In, e.g., a GMSK signal transmission, the length of the CPR can be as long as 9.4 symbol periods in harsh fading, such as Hilly Terrain (HT) and Rural Area (RA) as defined in 3GPP standards.

Figure 2:
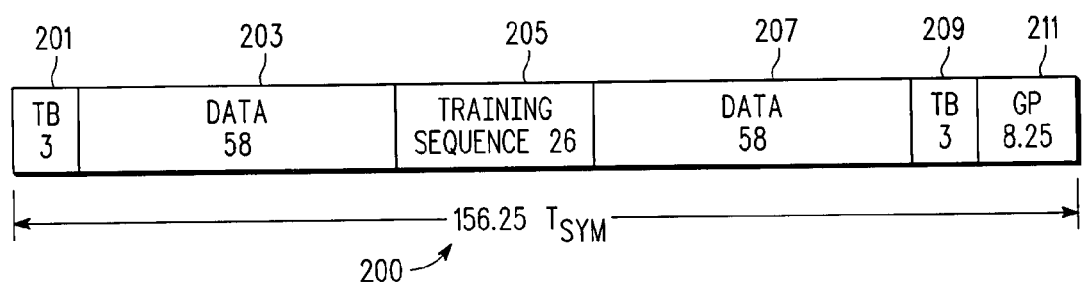
FIG. 2 depicts a diagram of bit allocation in an exemplary GMSK burst transmission.

Referring additionally to FIG. 2, a diagram of bit allocation in an exemplary GSM GMSK burst transmission will be briefly discussed and described and used to further describe the estimator and equalizer of FIG. 1 and others. FIG. 2 shows one burst in a GSM system, where the specific modulation for the burst can be, e.g., EDGE or GMSK. It is understood that other systems and air interface standards may have other allocation maps. The GMSK burst occupies or has a duration of or spans 156.25 symbol periods 200 or 156.25 bit periods or bit times at 1 bit per symbol. In GMSK, each burst duration is equivalent to 577 micro-seconds. As shown, the GMSK burst includes and spans 3 tail bits 201, a first data field 203 that includes or spans 58 bits, a training sequence 205 of 26 bits, a second data field 207 that includes or spans 58 bits, 3 more tail bits 209, followed by a gap 211 equivalent to 8.25 bit times. The training sequence is a predetermined sequence of symbols or bits as specified in the relevant standards, e.g., GMSK standards. As is known and specified in the various air interface standards for GMSK systems, 8 bursts comprise one Time Division Multiplex Access (TDMA) frame, which is transmitted via one radio frequency carrier. Different TDMA frames may be frequency hopped on different radio frequency carriers. Twenty-six (26) TDMA frames comprises one multiframe. Fifty-one multiframes are included in a superframe and 2048 superframes are included in a hyperframe. In GMSK each bit is transmitted as one of two symbols (+/−1) with a symbol rotation of $\pi/2$. A given symbol or the resultant energy for that symbol will impact 4 symbol or bit times.

The linear equalizer estimator 103 or estimation process generally provides filter coefficients for two filters for each received signal as well as timing information based on the received signal $x_n$ corresponding to the training sequence and the known training sequence $I_n$ 205 for each transmitted and thus received burst, using one or more generally known techniques, e.g., Minimum Mean Square Error (MMSE) or Weighted MMSE. The equalizer 105, given the timing information and filter coefficients from the linear estimator, generally operates or functions to remove or reduce distortion or interference in the received symbols or bits. The training sequence by being placed in the middle of a burst allows information symbols closest to the training sequence to facilitate reduction of the impact of channel variations over or during the burst. With this arrangement of the training sequence, the equalizer can operate or adjust or compensate in both directions, i.e., from the training sequence to or across earlier received data or the first data field 203 as well as from the training sequence to or across later received data or the second data field 207, and thereby better account for channel variations over the time duration or span of the received signal burst (or burst of the received signal).

A linear equalizer as is known and utilized for GMSK receivers generally includes two filters. After the baseband signal $x_n$ is de-rotated, the complex samples are split into their respective real (in phase or I) and imaginary (quadrature or Q) parts. The real part is processed by one of the filters defined via the linear equalizer estimator and the imaginary part is processed by the second filter. Typical properties associated with each of these filters are 5 taps spanning 2.5 symbol periods. The linear equalizer performs reasonably well for GMSK signals in high co-channel interference environments but performs poorly in a moderate interference or a multiple interference (co-channel, adjacent channel, and additive noise) environment.

Figure 3:
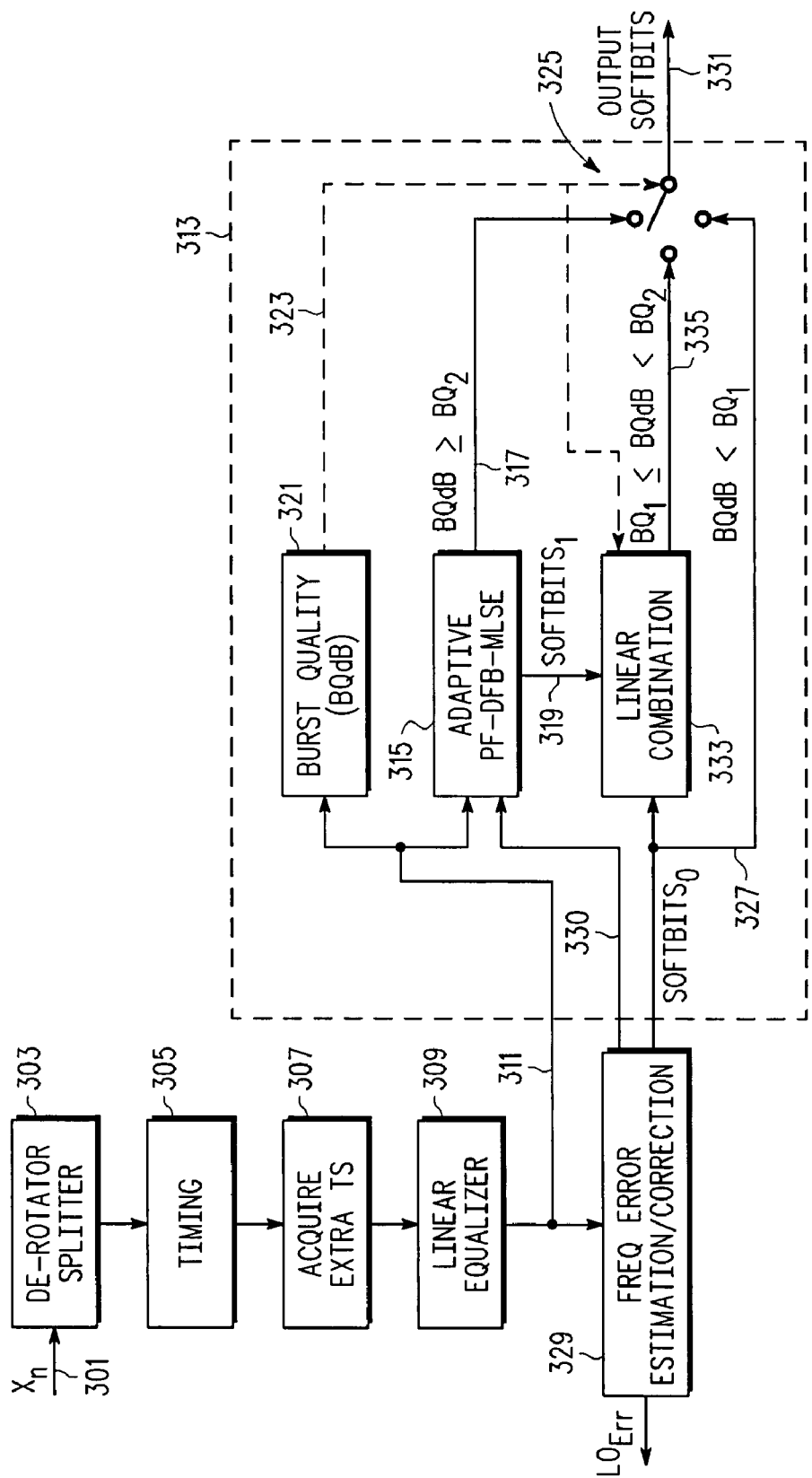
FIG. 3 depicts in a simplified and representative form a high level diagram of a GMSK receiver with more detail on the interference cancellation in accordance with one or more embodiments.

Referring to FIG. 3, a representative diagram of a GMSK receiver with details of the interference cancellation (SAIC/MAIC equalizer) in accordance with one or more embodiments will be discussed and described. FIG. 3 shows the baseband signal x, at input 301 being applied to a derotator/splittor 303, which removes the $\pi/2$ rotation and splits the complex signal into I and Q parts. The I and Q parts are used to acquire timing 305 via known approaches, e.g., a sequence of timing trials, on each timing trial, the error energy of the filter output corresponding to the training symbols as compared to the known training symbol is calculated. The timing trial with the smallest error energy will be used as the best timing trial. Additional "training symbols" are acquired 307 or utilized to finalize the equalizer estimation that will be applied to the entire burst. For example the tail bits at each end of the transmitted burst are known and can be used for training. Symbols near the training symbols may also be used to facilitate training. These symbols by being near the training sequence are likely accurate and thus can be estimated based on the filter output given the best timing trial. In some embodiments an additional 6 most likely symbols are determined from the two data fields. These activities improve the definition of the linear equalizer, i.e., coefficients that define the two filters in the linear equalizer 309. In receivers with two antennas the processes and functions indicated by 303-309 are duplicated for the additional baseband signal.

The GSMK receiver of FIG. 1 and FIG. 3 includes the linear equalizer 309 that is configured to be coupled to a received signal $x_n$ and to provide first soft bits at output 311. The first soft bits are coupled to a further interference canceller 313, which selects the appropriate interference equalizer or canceller based on a quality indication reflective of burst quality. More particularly an adaptive Most Likely Sequence Estimator (MLSE) is coupled to the first soft bits and configured to provide second soft bits at output 317 and in some embodiments output 319. Various embodiments of the adaptive MLSE will be described below with reference to FIG. 7 for a SAIC and with reference to FIG. 8 for an MAIC. Also shown and included is a quality assessor 321 or burst quality assessor that is coupled to the first soft bits and provides a quality indication, BQdB, at output 323. One or more embodiments of the quality assessor will be further described below with reference to FIG. 4 for a SAIC and FIG. 5 for a MAIC. Additionally included is a switching function 325 that is coupled at 327 to the linear equalizer, e.g., via the frequency error corrector 329, and also coupled to the adaptive MLSE at 317. The switching function is controlled in accordance with the quality indication so as to provide output soft bits at 331. The output soft bits correspond to at least one of the first soft bits or the second soft bits.

The frequency error corrector 329 is coupled to the linear equalizer at 311 and is configured to provide the first soft bits compensated in accordance with a frequency error estimate to the switching function. As will be further discussed below with reference to FIG. 6, the frequency error corrector is configured to develop the frequency error estimate or estimate the frequency error from the first soft bits, which are real valued information (I part and Q part as filtered). The frequency error corrector estimates an Assist signal that is used to obtain the frequency error estimate and correction. The frequency error corrector 329 also provides the Assist signal at 330, which may be used by the adaptive MLSE 315

Also included in some embodiments is a combiner 333 that is coupled to the first soft bits at 327 and the second soft bits at 319. The combiner 333 is configured to provide a combination of the first soft bits and the second soft bits, where this combination is also coupled to the switching function at terminal or input 335. The combiner in one or more embodiments is a linear combiner and is configured to provide at 335, a linear combination of the first and the second soft bits, where the linear combination is in accordance with the quality indication BQdB at 323. Thus, in some embodiments the switching function 325 or apparatus is further coupled to a combination, e.g., linear combination of the first soft bits and the second soft bits, and is controlled in accordance with the quality indication to provide soft bits at 331 where these soft bits are selected from the first soft bits, the second soft bits or the linear combination thereof.

Generally for high levels of interference (indicative of co-channel interference), i.e., for low values of BQdB, e.g., for BQdB<BQ1, a first threshold, the switching function is controlled to select the first soft bits at 327, as frequency error corrected, and provide these as the output soft bits. For higher values of BQdB indicative of lower levels of interference or a combination of interference (adjacent channel, co-channel, AWGN), e.g., BQdB≧BQ2, a second threshold, the switching function is controlled to select the second soft bits at 317 and provide these as the output soft bits. In embodiments that only have the first and second soft bits BQ1 can be equal to BQ2, i.e., there is only one threshold. In embodiments that include the combiner 333, when intermediate levels of interference are present, e.g., BQ1≦BQdB and BQdB<BQ2, the switching function 325 is controlled to select the combination of the first and second soft bits at 335 and provide these as the output soft bits. The threshold or thresholds BQ1, BQ2 can be experimentally determined given a particular receiver and performance expectations.

The combiner in one or more embodiments is configured to provide a weighted version of the first soft bits and a weighted version of the second soft bits and combine or add these weighted versions together to provide the combination at 335. The weighting can be controlled in accordance with BQdB, such that for levels of BQdB closer to BQ2, the second soft bits are more heavily weighted than the first soft bits, whereas for levels of BQdB closer to BQ1, the first soft bits are more heavily weighted than the second soft bits. In some embodiments the weighting is monotonic and linearly proportional to the position of BQdB between BQ1 and BQ2.

Referring to FIG. 4 and FIG. 5, a block diagram of a quality assessor for, respectively, a single and dual antenna system in accordance with one or more embodiments will be discussed and described. FIG. 4 illustrates the single antenna version of the quality assessor and shows the essence of linear equalizer 309. The quality assessor operates over the 26 symbol training sequence to provide the quality indication for a given burst. The linear equalizer shows the I part of $x_n$ input at 401 to a linear real valued filter $W_1$ 403 and the Q part of $x_n$ input at 405 to a linear real valued filter $W_2$ 407. The outputs from the filters are coupled to combiner 409, where they are added together and then coupled to decimator 412 for decimation by 2 to yield $x_n$, which is the first soft bits. The decimation process accounts for the 2× over sampling of the input samples. The soft bits are coupled to a combiner 411 where respective ones of the training symbols or bits $s_n$ are subtracted to provide an error $e_n$ for each soft bit. The error term is coupled to an averaging process or function 413, where the errors are squared and summed together with the sum being devided by 26 to provide a burst quality BQ. The BQ is coupled to a log function 451 where the base 10 log is provided to yield BQdB.

FIG. 5 shows a dual antenna version of the quality assessor. Many of the functions, signals, etc. are analogous to those of FIG. 4, although a 1 or 2 superscript has been added to refer to a first or second antenna, e.g., $x_n^{I1}$ refers to the real or I part of the received signal from a first antenna. FIG. 5 illustrates an additional linear equalizer 500 which is analogous to linear equalizer 309, however linear equalizer 500 is coupled to the I and Q part of samples from a second antenna. The I part is input at 501 to a filter $W_3$ 503 and the Q part is input at 505 to a filter $W_4$ 507 with the outputs from these filters coupled to combiner 509, where they are added together with the result processed by decimator 512 to yield $x_n^2$ or other and additional soft bits from the second antenna. The first soft bits and other soft bits from the respective antennas are coupled to combiner 511 where they are added together and where the respective training symbols $s_n$ are subtracted to provide an error $e_n$ for each soft bit. The errors are averaged 413 and a base 10 log 415 is provided as the BQdB.

Figure 6:
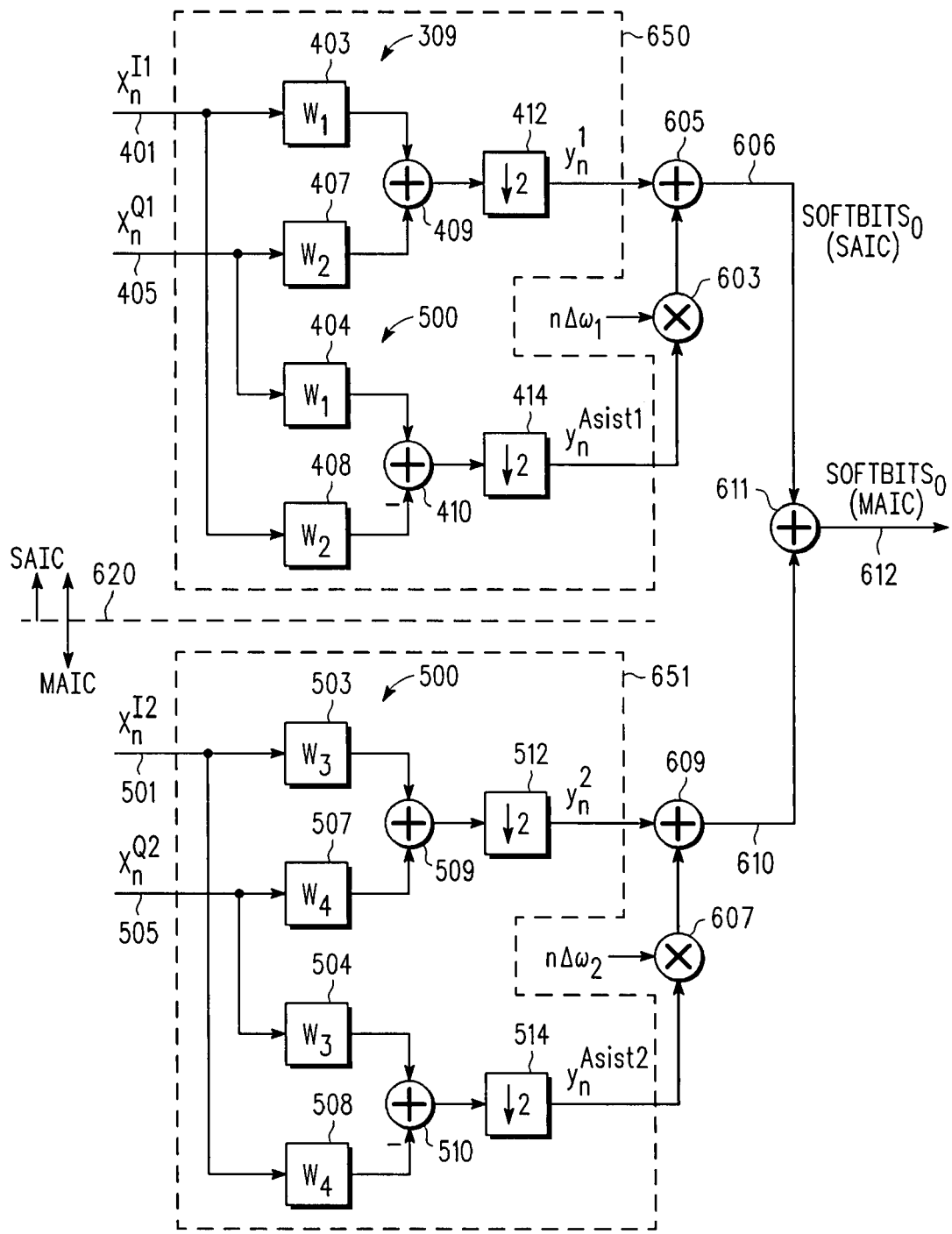
FIG. 6 illustrates a diagram showing a frequency error corrector in accordance with one or more embodiments.

Referring to FIG. 6, a diagram showing a frequency error corrector in accordance with one or more embodiments will be discussed and described. FIG. 6 shows a corrector that works for SAIC or MAIC systems as will become evident in the discussions. The frequency error corrector of FIG. 6 is processing samples in a burst other than the training sequence or training bits plus tail bits, i.e., for n=[−74, −73, . . . −14, +14, . . . +73, +74] or the information carrying symbols plus tail bits in a GMSK burst. FIG. 6 shows the linear equalizer 309 and constituent elements with the I part of samples from antenna 1 input at 401 to filter 403 and the Q part input at 405 to filter 407, where the outputs of these filters are summed at combiner 409 with the result decimated at decimator 412 to provide soft bits $y_n^1$ from the first antenna. The I part of the symbols is also input to filter 408, which is identical to filter 407 ($W_2$) and the Q part is provided to filter 404, which is identical to filter 403 ($W_1$). The output of filter 408 is subtracted from the output of filter 404 by combiner 410 with the result applied to decimator 414 to provide $y_n^{Asist1}$. The use of $y_n^{Asist1}$ allows for developing an indication of frequency error or change in frequency using only real valued numbers and processes for, e.g., filters, multipliers, etc. The values are applied to a multiplier 603 and multiplied by $n\Delta\omega_1$, where $n\Delta\omega_1$ is representative of the frequency error across the burst for the signal at antenna 1. The output from the multiplier 603 is coupled to combiner 605 along with the soft bits $y_n^1$ and added to the soft bits, thereby compensating the soft bits for any frequency error. In an SAIC the output 606 of combiner 605 has the first soft bits as compensated for a frequency error (soft bits$_O$) 327.

FIG. 6 also shows the linear equalizer 500 and constituent elements with the I part of samples from antenna 2 input at 501 to filter 503 and the Q part input at 505 to filter 507, where the outputs of these filters are summed at combiner 509 with the result decimated at decimator 512 to provide soft bits $y_n^2$ from the second antenna. The I part of the symbols is also input to filter 508, which is identical to filter 507 ($W_4$) and the Q part is provided to filter 504, which is identical to filter 503 ($W_3$). The output of filter 508 is subtracted from the output of filter 504 by combiner 510 with the result decimated by decimator 514 to provide $y_n^{Asist2}$. The use of $y_n^{Asist2}$ as noted above allows for developing an indication of frequency error using only real valued numbers and processes for, e.g., filters, multipliers, etc. The values $y_n^{Asist2}$ are applied to a multiplier 607 and multiplied by $n\Delta\omega_2$, where this is representative of the frequency error across the burst for the signal at antenna 2. The output from the multiplier 607 is coupled to combiner 609 along with the soft bits $y_n^2$ and added to these soft bits, thereby compensating the soft bits for any frequency error. In a MAIC the output 610 of combiner 609 carries the other soft bits from the second antenna as compensated for any frequency error. The soft bits as frequency error compensated from combiner 605 and 609 are simply added together in combiner 611 to provide soft bits$_0$ $y_n$ 327 at output 612 for a multiple antenna system.

The values for $y_n^{Asist1}$ (SAIC) or $y_n^{Asist1}$ and $y_1^{Asist2}$ (MAIC) are provided to the adaptive MLSE at 330. It will be noted that the structure of FIG. 6 may be used for either SAIC or MAIC receivers. If there is no second antenna the inputs at 501 and 505 should be 0 and the output from combiner 609 should be 0. In an SAIC system only the portion of the FIG. 6 structure above line 620 is used whereas for a MAIC system the entire structure can be used. FIG. 6 illustrates among other concepts and processes, a second or other linear equalizer configured to be coupled to a received signal from a second antenna and to provide additional soft bits corresponding to this signal and a quality assessor that is coupled to a combination of the first soft bits (first antenna) and the second soft bits (second antenna) and configured to provide a quality indication based on the combination. Also in FIG. 6 the structure 650 and 651 have been identified as these structures and processes are repeated in FIG. 7 and FIG. 8

To determine the $\Delta\omega_{1,2}$ the following matrix equation is solved for $\Delta\omega_1$ and $\Delta\omega_2$.

$$\begin{bmatrix} \sum_n n(y_n^{Asist1})^2 & \sum_n ny_n^{Asist1}y_n^{Asist2} \\ \sum_n ny_n^{Asist1}y_n^{Asist2} & \sum_n n(y_n^{Asist2})^2 \end{bmatrix} \begin{bmatrix} \Delta\omega_1 \\ \Delta\omega_2 \end{bmatrix} = \begin{bmatrix} \sum_n n[\hat{s}_n - y_n]y_n^{Asist1} \\ \sum_n n[\hat{s}_n - y_n]y_n^{Asist2} \end{bmatrix} \quad (2)$$

Where n as noted above is given by n=[−74,−73,−72, −71, . . . , −14,+14, . . . , +71,+72,+73,+74], $\hat{s}_n$=sig[$y_n$], and $y_n = y_n^1 + y_n^2$. If the frequency error on received signal $\{x_n^{I1}, x_n^{Q1}\}$ from antenna 1 and the frequency error on received signal $\{x_n^{I2}, x_n^{Q2}\}$ from antenna 2 are, respectively, $\Delta f_1$ and $\Delta f_2$ in Hz. The normalized representation of $\Delta f_1$ and $\Delta f_2$ are related to $\Delta\omega_1$ and $\Delta\omega_2$ as follows:

$$\begin{cases} \Delta\omega_1 = 2\pi \Delta f_1 \Delta t \\ \Delta\omega_2 = 2\pi \Delta f_2 \Delta t \end{cases} \quad (3)$$

To avoid erroneous estimates, e.g., due to excess noise and interference, if the estimated frequency error is larger than a threshold, the estimated error is limited by a threshold. This can be represented by Equation (4)

$$\Delta\omega_{1,2} = \begin{cases} \Delta\omega_{1,2} & \text{if } |\Delta\omega_{1,2}| < \text{Threshold} \\ sig(\Delta\omega_{1,2})\text{Threshold} & \text{otherwise} \end{cases} \quad (4)$$

Where in one embodiment the threshold=0.005, which corresponds to 215 Hz. The frequency error correction to the soft-bits estimate is made as follows:

$$y_n = y_n + y_n^{Asist1} n\Delta\omega_1 + y_n^{Asist2} n\Delta\omega_2 \quad (5)$$

which is provided at the output of combiner 611 and as soft bits$_0$ at 327.

Figure 7:
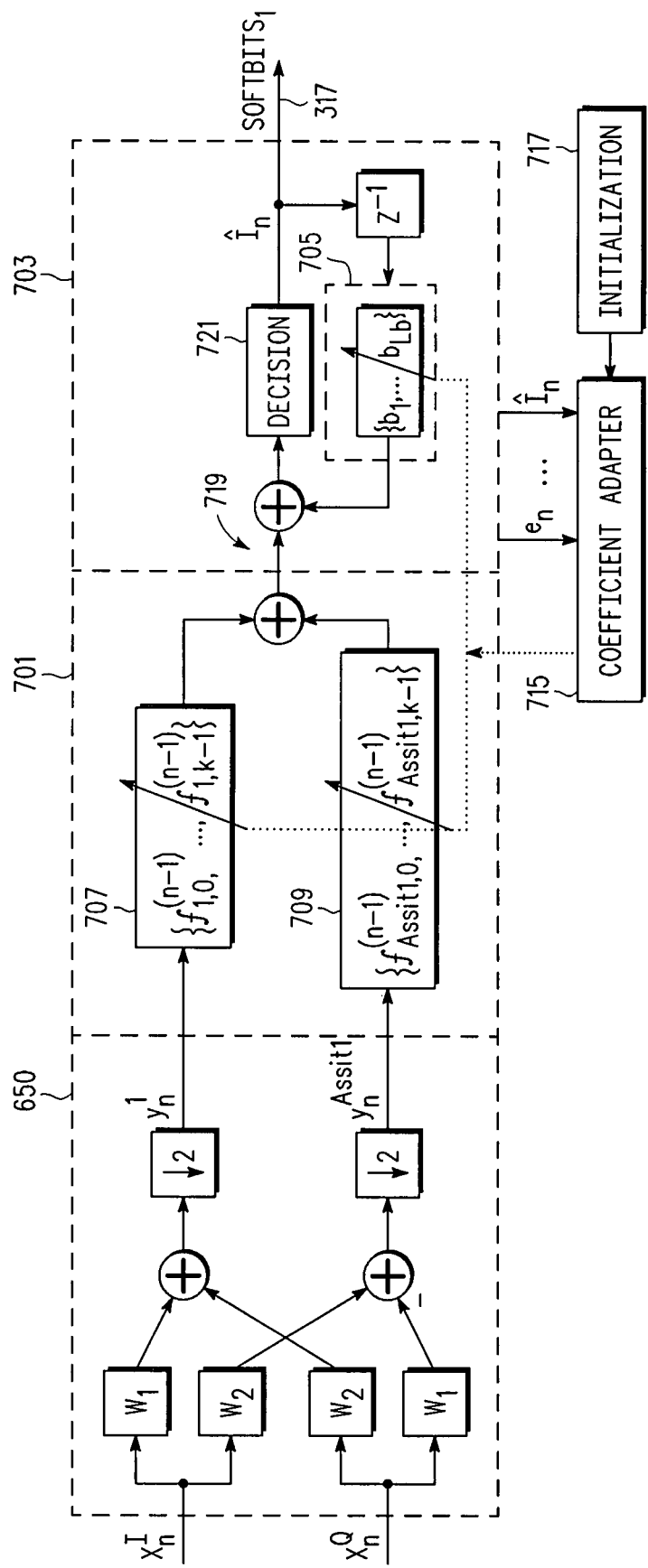
FIG. 7 and FIG. 8 show diagrams illustrating a structure for an adaptive MLSE for, respectively a single and dual antenna system in accordance with one or more embodiments.
Figure 8:
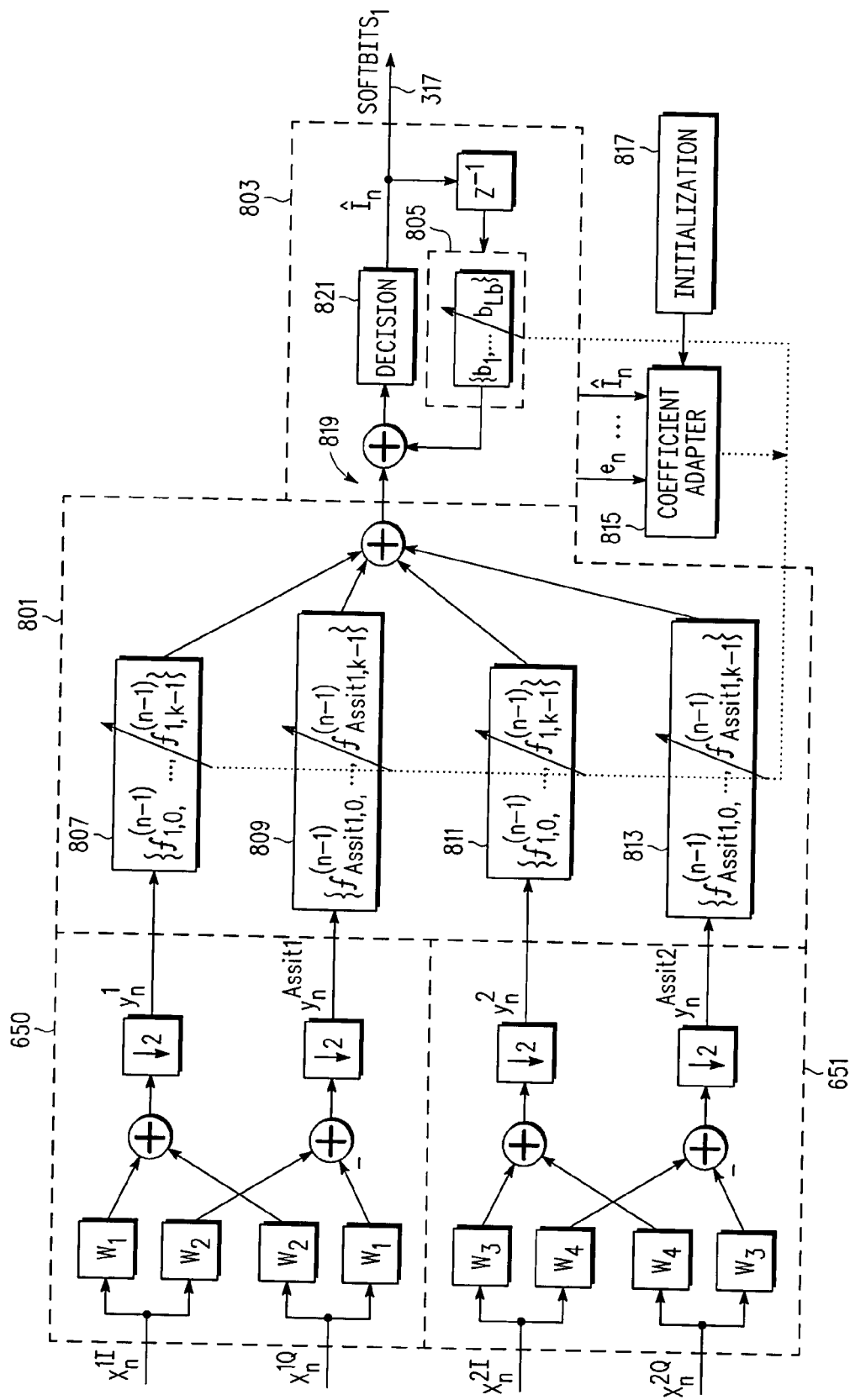

Referring to FIG. 7 and FIG. 8, diagrams illustrating a structure for an adaptive MLSE for, respectively, a single and dual antenna system in accordance with one or more embodiments will be discussed and described. FIG. 7 shows the adaptive MLSE for a SAIC (single antenna) system where the left hand portion is analogous to and operates in accordance with the structure 650 in FIG. 6. FIG. 8 illustrates the adaptive MLSE for a MAIC (Multiple antenna) system where the left hand portion is analogous to the structures 650, 651 in FIG. 6. The adaptive MLSE in various embodiments is configured as one or more adaptive pre-filters (701 in FIGS. 7 and 801 in FIG. 8) coupled to a decision driven MLSE 703, 803 that includes an adaptive feed back filter 705, 805 and which provides the soft bits at 317. Note that the MLSE uses a Viterbi algorithm or trellis to determine the most likely surviving sequence from all possible sequences and thus the soft bits will only be available after some portion of the samples have been processed. Essentially as will be appreciated the structure shown in 701, 703 and 801, 803 is duplicated one time for each survivor during the Viterbi trellis search.

In FIG. 7 the adaptive MLSE is configured with two adaptive pre-filters 707, 709 where one of the adaptive pre-filters 707 is processing a first combination $y_n^1$ of real valued information corresponding to in phase (I) and quadrature (Q) values associated with the received signal and where the other one of the adaptive pre-filters 709 is processing a second combination $y_n^{Asist1}$ of real valued information corresponding to in phase values and quadrature values associated with or corresponding to the received signal. The outputs of the two pre-filters are combined together with the output of the feed back filter 705 at combiners 719. FIG. 8 is similar but dealing with two antennas and thus two combinations $y_n^1$, $y_n^{Asist1}$ for the first antenna and two combinations $y_n^2$, $y_n^{Asist2}$ for the second antenna which are processed, respectively, by four adaptive pre-filters 807, 809, 811, 813. The output of these filters is combined together with the output of the feed back filter 805 in combiners 819.

The adaptive MLSE is configured to adapt coefficients for the one or more adaptive pre-filters as well as the adaptive feed back filter using respectively the coefficient adaptor 715, 815. The adaptation starts for each burst from a constant initialization condition, represented as initialization condition or vector 717, 817. In one or more embodiments the adaptive pre-filters are each defined by two coefficients, i.e. $K_1$=1, and the adaptive feed back filters are defined by two coefficients, i.e., $L_b$=2. In this instance with filters defined by two coefficients the initialization vector can be a non zero constant with all other elements equal to zero. For FIG. 7 an appropriate initialization vector if two tap filters are used, is [1,0,0,0,0,0] for filters 707, 709, 505 respectively. For FIG. 8 the corresponding initialization vector is [1,0,0,0,0,0,0,0,0,0] for filters 807, 809, 811, 813, 805. These filters will each be adapted in accordance with a decision feed back MLSE using the procedures discussed below.

As is evident, FIG. 8 illustrates a GMSK receiver with interference cancellation comprising: a first linear equalizer 650 configured to be coupled to a first received signal from a first antenna and to provide first soft bits $y_n^1$, a second linear equalizer 651 configured to be coupled to a second received signal from a second antenna and to provide second soft bits $y_n^2$, and an adaptive MLSE 801, 803 coupled to the first soft bits and the second soft bits and configured to provide third soft bits (soft bits$_1$ at 317). The quality assessor discussed with reference to FIG. 3 and FIG. 6 can be coupled to the first and the second soft bits and configured to provide a quality indication that can be coupled to the switching function 325. The switching function is coupled to fourth soft bits (output of combiner 611) corresponding to the first and the second soft bits and to the third soft bits and controlled in accordance with the quality indication to provide output soft bits corresponding to at least one of the fourth soft bits and the third soft bits.

As suggested some embodiments of the GMSK receiver of FIG. 8 can include a frequency error corrector (FIG. 6) coupled to the first and the second linear equalizer and configured to provide the fourth soft bits to the switching function, where the fourth soft bits are compensated in accordance with a frequency error estimate, which is developed from the first and the second soft bits (which are real valued information). As suggested above with reference to FIG. 3, the linear combiner 333 can be coupled to the fourth soft bits and the third soft bits and configured to provide a linear combination of the fourth soft bits and the third soft bits to the switching function. In some embodiments, the linear combination is in accordance with the quality indication. With the linear combiner providing the combination of soft bits, the switching function of FIG. 3 can also be connected to the combination and controlled in accordance with the quality indication to provide output soft bits selected from the fourth soft bits, third soft bits, and the combination.

The process of adaptation to obtain the coefficients for the adaptive MLSE will now be discussed first with reference to the single antenna (SAIC) system of FIG. 7 and later the discussion will be extended to the two antenna system of FIG. 8. The output of the SAIC linear equalizer is $y_n^1$ and if there is no frequency error this is the soft bits corresponding to the burst from antenna 1. Another signal $y_n^{Asist1}$ is an assistant signal generated for frequency error correction or compensation for soft bits $y_n^1$. Generally, the soft bits signal $y_n^1$ has no residual Inter Symbol Interference (ISI). A decision feedback equalizer or decision feedback MLSE directly following the $y_n^1$ will not typically provide any additional performance gain under these circumstances. In order to use MLSE to further remove noise in $y_n^1$, certain ISI can be introduced into $y_n^1$.

The pre-filter $\{f_{1,0}^{(n-1)} \ldots, f_{1,K-1}^{(n-1)}\}$ in front of the decision-feedback equalizer or decision feedback MLSE 703 serves the purpose to introduce certain ISI into $y_n^1$. $b_l^{n-1}, n=0, 1, \ldots, L_b$ can be considered as the introduced residual CPR; To achieve that purpose, $\{f_{1,0}^{(n-1)} \ldots, f_{1,K-1}^{(n-1)}\}$ is initialized with $\{1,0\ldots,0\}$, $\{f_{Asist1,0}^{(n-1)} \ldots, f_{Asist1,K-1}^{(n-1)}\}$ is initialized with $\{0,\ldots,0\}$, and $\{b_l^{n-1}, n=1, \ldots, L_b\}$ is initialized with all 0. Then let the adaptation process run with the soft bits $y_n^1$ and $y_n^{Asist1}$ that correspond to the training sequence $(n=+/-14)$ and use the known training sequence $I_n$, instead of the hard decision $\hat{I}_n$ from the soft bits $y_n^1$, to drive the adaptive decision feedback equalizer. If the pre-filter $\{f_{1,0}^{(n-1)} \ldots, f_{1,K-1}^{(n-1)}\}$ is considered part of the SAIC linear equalizer $\{W_1, W_2\}$, this adaptive training process can be considered as using the pre-filter $\{f_{1,0}^{(n-1)} \ldots, f_{1,K-1}^{(n-1)}\}$ to deform the SAIC linear equalizer $\{W_1, W_2\}$ so that the soft bits have residual ISI and the residual ISI is with a minimum phase shape, thus the decision feedback MLSE can be applied to further enhance the performance.

After the adaptive decision feedback equalizer has been trained with the training sequence $I_n$, the trained filter coefficients:

$$\{f_{1,0}^{(n-1)} \ldots, f_{1,K-1}^{(n-1)}\}, \{f_{Asist1,0}^{(n-1)} \ldots, f_{Asist1,K-1}^{(n-1)}\}, \{b_1^{(n-1)} \ldots, b_{L_b}^{(n-1)}\}$$

will be used as for the following per-survivor based adaptive decision feedback MLSE for each survivor. In addition to introducing residual ISI for the decision feedback MLSE, $\{f_{1,0}^{(n-1)} \ldots, f_{1,K-1}^{(n-1)}\}, \{f_{Asist1,0}^{(n-1)} \ldots, f_{Asist1,K-1}^{(n-1)}\}$ also serves to compensate for amplitude attenuation and phase rotation due to fading and LO error. The key equations in the adaptive decision feedback equalizer can be given as follows:

$$e_n = \left\{ \sum_{k=0}^{K-1} y_{n-k}^1 f_{1,k}^{(n-1)} + \sum_{k=0}^{K-1} y_{Asist1,k}^{(n-1)} f_{Asist1,k}^{(n-1)} + \sum_{l=1}^{L_b} b_l^{(n-1)} \hat{I}_{n-l} \right\} - \hat{I}_n \quad (6)$$

where $\hat{I}_n, n=-\infty, \ldots, n$ is the estimated information sequence available so far. Equation (6) is an expression for the output of combiner 719 minus the present bits from the decision function 721. The $e_n$ and $\hat{I}_n$ are reported for each survivor to the coefficient adaptor, which performs the adaptation and provides the resultant coefficients to the appropriate filter.

In matrix form, Equation (6) can be written as $$e_n = \hat{I}_n - C'(n)Y(n) \quad (7)$$

where $$C(n) = \begin{bmatrix} f_{1,K-1}^{(n-1)} \\ \vdots \\ f_{1,0}^{(n-1)} \\ f_{Asist1,K-1}^{(n-1)} \\ \vdots \\ f_{Asist,K}^{(n-1)} \\ b_1^{(n-1)} \\ \vdots \\ b_{L_b}^{(n-1)} \end{bmatrix} \text{ and } Y(n) = \begin{bmatrix} y_{n-K+1}^1 \\ \vdots \\ y_n^1 \\ y_{n-K+1}^{Assit1} \\ \vdots \\ y_n^{Assit1} \\ \hat{I}_{n-1} \\ \vdots \\ \hat{I}_{n-L_b} \end{bmatrix} \quad (8)$$

The C(n) can be updated either by LMS approach or RLS approach. With LMS approach, C(n) is updated as follows $$C(n+1) = C(n) + \beta e_n Y^*(n) \quad (9)$$

where $\beta$ controls the tracking speed. With RLS approach, the C(n) is updated as follows $$\mu_n = Y'(n)P(n-1)Y^*(n) \quad (10)$$

$$K(n) = \frac{1}{\beta + \mu(t)} P(n-1)Y^*(n)$$

$$P(n) = \frac{1}{\beta}[P(n-1) - K(n)Y'(n)P(n-1)]$$

$$C(n) = C(n-1) + K(n)e_n.$$

The concepts discussed for a SAIC system can be readily extended to a MAIC receiver. The key equations are as follows:

$$e_n = \left\{ \begin{array}{l} \sum_{k=0}^{K-1} y_{n-k}^1 f_{1,k}^{(n-1)} + \sum_{k=0}^{K-1} y_{n-k}^{Assit1} f_{Assit1,k}^{(n-1)} + \\ \sum_{k=0}^{K-1} y_{n-k}^2 f_{1,k}^{(n-1)} + \sum_{k=0}^{K-1} y_{n-k}^{Assit2} f_{Assit1,k}^{(n-1)} + \\ \sum_{l=1}^{L_b} b_l^{(n-1)} \hat{I}_{n-l} \end{array} \right\} - \hat{I}_n \quad (11)$$

In matrix form, Equation (11) can be written as $$e_n = \hat{I}_n - C'(n)Y(n) \quad (12)$$

where $$C(n) = \begin{bmatrix} f_{1,K-1}^{(n-1)} \\ \vdots \\ f_{1,0}^{(n-1)} \\ f_{Asist1,K-1}^{(n-1)} \\ \vdots \\ f_{Asist1,K}^{(n-1)} \\ f_{2,K-1}^{(n-1)} \\ \vdots \\ f_{2,0}^{(n-1)} \\ f_{Asist2,K-1}^{(n-1)} \\ \vdots \\ f_{Asist1,K}^{(n-1)} \\ b_1^{(n-1)} \\ \vdots \\ b_{L_b}^{(n-1)} \end{bmatrix} \text{ and } Y(n) = \begin{bmatrix} y_{n-K+1}^1 \\ \vdots \\ y_n^1 \\ y_{n-K+1}^{Assit1} \\ \vdots \\ y_n^{Assit1} \\ y_{n-K+1}^1 \\ \vdots \\ y_n^2 \\ y_{n-K+1}^{Assit2} \\ \vdots \\ y_n^{Assit2} \\ \hat{I}_{n-1} \\ \vdots \\ \hat{I}_{n-L_b} \end{bmatrix} \quad (13)$$

The C(n) can be updated either by LMS approach or RLS approach. With LMS approach, C(n) is updated as follows $$C(n+1) = C(n) + \beta e_n Y^*(n) \quad (14)$$

where β controls the tracking speed. With RLS approach, the C(n) is updated as follows $$\mu_n = Y'(n)P(n-1)Y^*(n) \quad (15)$$

$$K(n) = \frac{1}{\beta + \mu(t)} P(n-1)Y^*(n)$$

$$P(n) = \frac{1}{\beta}[P(n-1) - K(n)Y'(n)P(n-1)]$$

$$C(n) = C(n-1) + K(n)e_n$$

Figure 9:
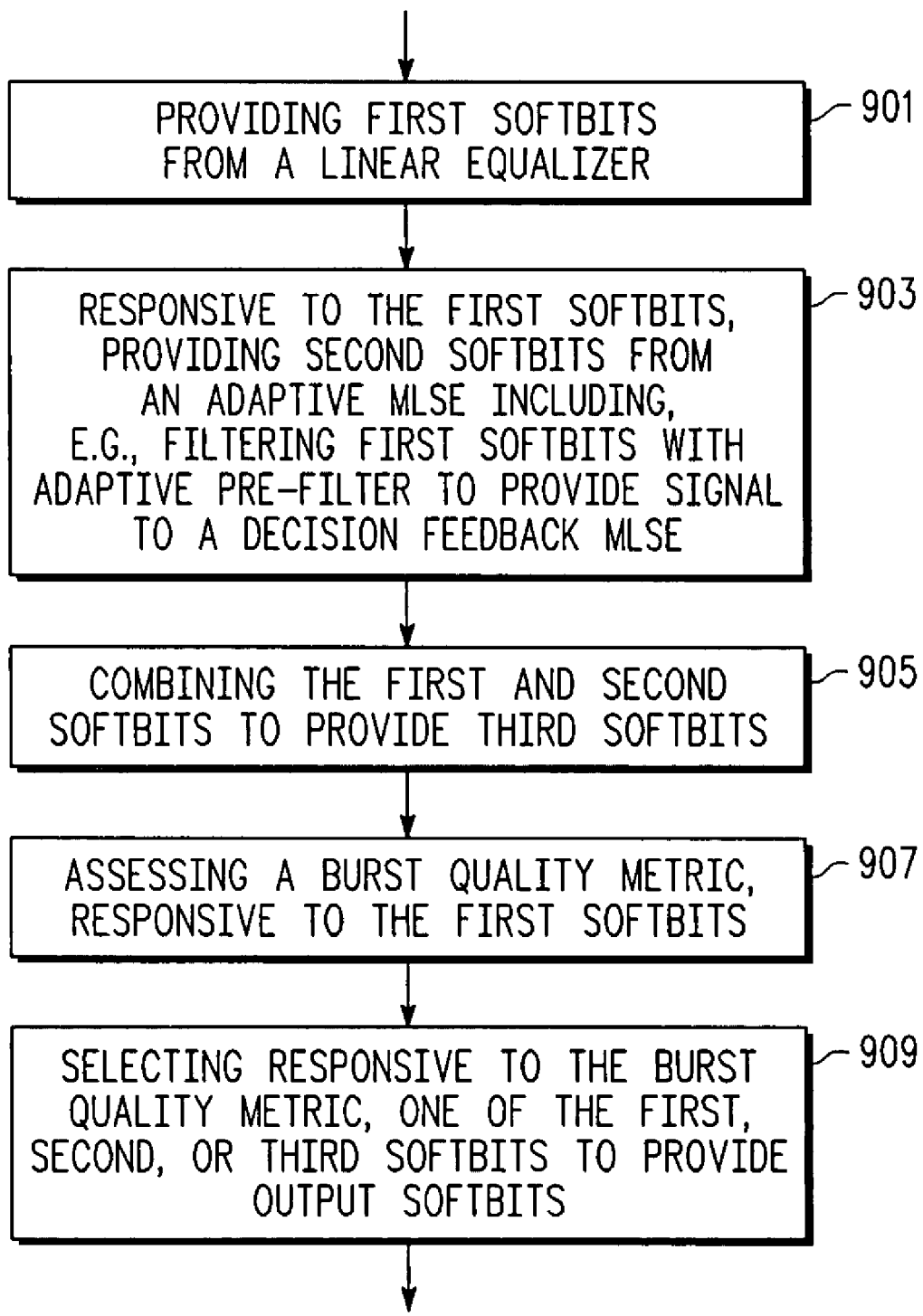
FIG. 9 shows a flow chart illustrating representative embodiments of a method of receiving a GMSK signal including interference cancellation in accordance with various embodiments.

Referring to FIG. 9 a flow chart illustrating representative embodiments of a method of receiving a GMSK signal including interference cancellation in accordance with one or more embodiments will be discussed and described. FIG. 9 shows a method that may be practiced by one of more of the above described apparatus or others with similar functionality. The method as illustrated only covers some of the processes discussed above and is somewhat in the nature of a review of some of these processes. It is understood that the method of FIG. 9 can include additional processes, such as one or more of those discussed above.

The methods in FIG. 9 begin with providing first soft bits from a linear equalizer which is coupled to a receive signal 901 (see, e.g., FIG. 3, 309 311). Then responsive to the first soft bits, providing second soft bits from an adaptive Most Likely Sequence Estimator (MLSE) 903 (see, e.g., FIG. 3, 315, 317, where the providing second soft bits can further comprise filtering the first soft bits with an adaptive pre-filter (see, e.g., FIG. 7, 701 to provide a filtered signal to a decision feed back MLSE (see, e.g., FIG. 7, 703 that includes an adaptive feed back filter. Given the second and first soft bits, 905 shows combining the first soft bits and the second soft bits to provide third soft bits (see, e.g., FIG. 3 333, 335). A quality indication is assessed at 907 or specifically 907 shows assessing, responsive to the first soft bits, a burst quality metric (see, e.g., FIG. 3, 321 323). The process ends at 909 with selecting, responsive to the burst quality metric, one of the first soft bits, the second soft bits, and the third soft bits to provide output soft bits (see, e.g., FIG. 3, 325).

While not specifically shown, the adaptive MLSE with the adaptive pre-filter and adaptive feed back filter will need to implement adaptation of the adaptive pre-filter and the adaptive feed back filter. The adaptation in one or more embodiments comprises initialization of the adaptive pre-filter and the adaptive feed back filter with a constant predetermined vector. Among the various other processes that can be included but are not specifically shown are, e.g., the combining in accordance with the burst quality metric, frequency error correction, and extension of the methods to a MAIC system.

It will be appreciated that the above described functions and structures may be implemented in one or more integrated circuits. For example, many or all of the functions can be implemented in a digital signal processor with appropriate capabilities. Using the techniques and concepts discussed and described herein significantly improves interference cancellation in a GMSK receiver, particularly for moderate and varying forms of interference.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A Gaussian Minimum Shift Keyed (GMSK) receiver with interference cancellation comprising:
    a linear equalizer configured to be coupled to a received signal from a first antenna and to provide first soft bits;
    an adaptive Most Likely Sequence Estimator (MLSE) coupled to the first soft bits and configured to provide second soft bits based on the first soft bits;
    a quality assessor coupled to the first soft bits and configured to provide a quality indication; and
    a switching function coupled to the linear equalizer and the adaptive MLSE and controlled in accordance with the quality indication to provide output soft bits corresponding to at least one of the first soft bits and the second soft bits.

2. The GMSK receiver of claim 1 further comprising a frequency error corrector coupled to the linear equalizer and configured to provide the first soft bits compensated in accordance with a frequency error estimate to the switching function.

3. The GMSK receiver of claim 2 wherein the frequency error corrector is configured to develop the frequency error estimate from the first soft bits which are real valued information.

4. The GMSK receiver of claim 1 further comprising a combiner coupled to the first soft bits and the second soft bits and configured to provide a combination of the first soft bits and the second soft bits, the combination coupled to the switching function.

5. The GMSK receiver of claim 4 wherein the combiner is a linear combiner and is configured to provide a linear combination of the first soft bits and the second soft bits, the linear combination in accordance with the quality indication.

6. The GMSK receiver of claim 1 wherein the switching function is further coupled to a linear combination of the first soft bits and the second soft bits and is controlled in accordance with the quality indication to provide soft bits selected from the first soft bits, the second soft bits, and the linear combination.

7. The GMSK receiver of claim 1 wherein the adaptive MLSE is further configured as one or more adaptive pre-filters coupled to a decision driven MLSE including an adaptive feed back filter.

8. The GMSK receiver of claim 7 wherein the adaptive MLSE is further configured as two adaptive pre-filters with one adaptive pre-filter processing a first combination of real valued information corresponding to in-phase values and quadrature values corresponding to the received signal and a second adaptive filter processing a second combination of real valued information corresponding to in-phase values and quadrature values corresponding to the received signal.

9. The GMSK receiver of claim 7 wherein the adaptive MLSE is further configured to adapt coefficients for the one or more adaptive pre-filters and the adaptive feed back filter starting from a constant initialization condition.

10. The GMSK receiver of claim 9 wherein the one or more adaptive pre-filters are each defined by two coefficients and the adaptive feedback filter is defined by two coefficients wherein these coefficients are initialized, respectively, by a constant initialization vector including a first element equal to a nonzero constant and all other elements equal to 0 and wherein these filters are adapted in accordance with a decision feed back MLSE.

11. The GMSK receiver of claim 1 further comprising an other linear equalizer configured to be coupled to a received signal from a second antenna and to provide additional soft bits, wherein the quality assessor is further coupled to a combination of the first soft bits and the additional soft bits and configured to provide a quality indication based on the combination.

12. A Gaussian Minimum Shift Keyed (GMSK) receiver with interference cancellation comprising:
a first linear equalizer configured to be coupled to a first received signal from a first antenna and to provide first soft bits;
a second linear equalizer configured to be coupled to a second received signal from a second antenna and to provide second soft bits;
an adaptive estimator coupled to the first soft bits and the second soft bits and configured to provide third soft bits;
a quality assessor coupled to the first and the second soft bits and configured to provide a quality indication; and
a switching function coupled to fourth soft bits corresponding to the first and the second soft bits and to the third soft bits and controlled in accordance with the quality indication to provide output soft bits corresponding to at least one of the fourth soft bits and the third soft bits.

13. The GMSK receiver of claim 12 further comprising a frequency error corrector coupled to the first and the second linear equalizer and configured to provide the fourth soft bits to the switching function, wherein the fourth soft bits are compensated in accordance with a frequency error estimate and the frequency error estimate is developed from the first and the second soft bits, which are real valued information.

14. The GMSK receiver of claim 12 further comprising a linear combiner coupled to the fourth soft bits and the third soft bits and configured to provide a linear combination of the fourth soft bits and the third soft bits to the switching function, the linear combination in accordance with the quality indication.

15. The GMSK receiver of claim 12 wherein the switching function is further coupled to a linear combination of the fourth soft bits and the third soft bits and is controlled in accordance with the quality indication to output soft bits selected from the fourth soft bits, the third soft bits, and the linear combination.

16. The GMSK receiver of claim 12 wherein the adaptive estimator is an adaptive Most Likely Sequence Estimator (MLSE), which is further configured with one or more adaptive pre-filters coupled to a decision driven MLSE including an adaptive feed back filter.

17. The GMSK receiver of claim 16 wherein the one or more adaptive pre-filters comprises a first pair of adaptive pre-filters coupled to differing combinations of real valued information corresponding to in-phase and quadrature values for the first soft bits and a second pair of adaptive pre-filters coupled to differing combinations of real valued information corresponding to in-phase and quadrature values for the second soft bits.

18. The GMSK receiver of claim 17 wherein the adaptive MLSE is further configured to adapt coefficients for the first and the second pair of adaptive pre-filters and the adaptive feed back filter starting from a constant initialization vector and adapted in accordance with a decision feed back MLSE.

19. A method of receiving a Gaussian Minimum Shift Keyed (GMSK) signal, the method including interference cancellation, the method comprising:
providing first soft bits from a linear equalizer coupled to a receive signal;
then providing, responsive to the first soft bits, second soft bits from an adaptive Most Likely Sequence Estimator (MLSE);
combining the first soft bits and the second soft bits to provide third soft bits;
assessing, responsive to the first soft bits, a burst quality metric; and
selecting, responsive to the burst quality metric, one of the first soft bits, the second soft bits, and the third soft bits to provide output soft bits.

20. The method of claim 19 wherein the providing second soft bits further comprises filtering the first soft bits with an adaptive pre-filter to provide a filtered signal to a decision feed back MLSE that includes an adaptive feed back filter.

21. The method of claim 20 further comprises adaptation of the adaptive pre-filter and the adaptive feed back filter, wherein the adaptation further comprises initialization of the adaptive pre-filter and the adaptive feed back filter with a constant predetermined vector.

* * * * *